United States Patent [19]

Kato et al.

[11] Patent Number: 4,929,823
[45] Date of Patent: May 29, 1990

[54] OPTICAL PICKUP HEAD WITH HOLOGRAPHIC SERVO SIGNAL DETECTION USING A SPOT SIZE DETECTION SYSTEM

[75] Inventors: Makoto Kato, Nishinomiya; Tetsuo Saimi, Hirakata; Shunji Ohara, Higashiosaka, all of Japan

[73] Assignee: Matsushita Electric Industrial Co., Ltd., Osaka, Japan

[21] Appl. No.: 253,076

[22] Filed: Oct. 4, 1988

[30] Foreign Application Priority Data

Oct. 5, 1987 [JP] Japan ................................ 62-251025
Oct. 5, 1987 [JP] Japan ................................ 62-251026

[51] Int. Cl.⁵ .............................................. G01J 1/20
[52] U.S. Cl. ................................... 250/201.5; 369/45
[58] Field of Search ............................. 250/201, 202; 369/44–46, 109, 112

[56] References Cited

U.S. PATENT DOCUMENTS

| | | | |
|---|---|---|---|
| 4,525,625 | 6/1985 | Abe | 250/201 DF |
| 4,665,310 | 5/1987 | Heemskerk . | |
| 4,731,772 | 3/1988 | Lee . | |
| 4,771,411 | 9/1988 | Greve | 369/45 |
| 4,789,977 | 12/1988 | Oudenhuysen et al. | 369/109 |

OTHER PUBLICATIONS

Y. Kimura et al., "High Performance Optical Head Using Optimized Holographic Optical Element" Proc. of the International Simposium on Optical Memory, Tokyo, Sep. 16–18, 1987, p. 131.

K. Tatsumi et al., "A Multi-Functional Refection Type Gratinglens for the CD Optical Head", Proc. of the International Simposium on Optical Memory, Tokyo, Sep. 16–18, 1987, p. 127.

"Speckle Reduction in Holography . . . " M. Kato et al. (Appl. Opt.), vol. 14 (1975).

U.S. Pat. No. 4,358,200.

Primary Examiner—David C. Nelms
Assistant Examiner—Khaled Shami
Attorney, Agent, or Firm—Stevens, Davis, Miller & Mosher

[57] ABSTRACT

An optical pickup head apparatus comprises a hologram element disposed in the flux of light reflected back from an optical disc, and first and second photodetectors respectively having linear element boundaries extending in a predetermined direction and disposed so as to receive two-focal-point images on their coplanar detection surfaces, whereby the tolerable width of variation in the light source wavelength and the tolerable range of error in the assembling adjustment of the optics can be extended considerably to permit stable differential signal detection.

16 Claims, 10 Drawing Sheets

OPTICAL PICKUP HEAD WITH HOLOGRAPHIC SERVO SIGNAL DETECTION USING A SPOT SIZE DETECTION SYSTEM

BACKGROUND OF THE INVENTION

This invention relates to an optical pickup head apparatus which can be used for recording and reproducing or erasing optical information on and from an optical or opto-magnetic medium.

The optical memory technique using a pit-like pattern as a high-density and high-capacity storage medium has been practiced by finding many applications such as digital audio disk, video disk, document file disk and data file. The optical pickup head (hereinafter abbreviated as OPUH) apparatus is based on three functional components, i.e., (i) an imaging optics for forming a diffraction-limited micro-spot, (ii) a component for effecting focusing of the optics and tracking error signal detection as well as pit-signal detection, and (iii) an actuator. In the past, advanced aspherical lens design and highly precise press work technologies have contributed to remarkable size-reduction and weight-reduction of the functional component in item (i) above and consequently compactness and high performance of the actuator in item (iii) have promisingly been insured. As regards the component for error signal detection in item (ii), however, even a signal detection component for use in an OPUH apparatus dedicated to reproduction and capable of being constituted with the simplest optical system must comprise a beam splitting means, a focusing control means based on an astigmatic aberration method or a knife edge method and a tracking control means in independent form or combined form. Optical parts such as beam splitter, lens and prism to be used conventionally in the signal detection component are difficult to manufacture in mass production, to assemble and to adjust and have disadvantages from the standpoint of size reduction, cost reduction, mass production and reliability.

Recently, a countermeasure to solve the above problems has been reported in "High Performance Optical Head using Optimized Holographic Optical Element" by Y. Kimura et al, Proc. of the International Symposium on Optical Memory, Tokyo, Sept. 16–18, 1987 (p. 131). In this proposal, an optical element having a complex function is introduced to solve the aforementioned problems and as shown in FIG. 1b in the accompanying drawings of the present application, a hologram element 16 is disposed near a focusing lens 3. Conventionally, when a hologram element prepared using light of a wavelength $\lambda_1$ (400 to 500 nm) suitable for hologram recording is irradiated, for reconstruction, with a near infrared or red laser beam of a wavelength $\lambda_2$ (~800 nm or 633 nm) suitable for a light source of OPUH apparatus, the lens action of the hologram suffers from a noticeable aberration which is difficult to correct. Under the circumstances, the hologram element is generated by means of a computer under design consideration based on a so-called Fourier transform holographic system which is an optics model as shown in FIG. 1a wherein an interference fringe pattern due to interference of two points $P_1$ and $P_2$ with a reference beam R is formed or an $\epsilon$-$\eta$ plane or hologram surface (practically, an interference fringe pattern due to wave fronts 230 and 231 is formed on one half of the hologram surface and an interference fringe pattern due to wave fronts 230 and 232 is formed on the other half). Thus, the hologram element 16 used in FIG. 1b is prepared by electron beam graphics and in particular, has two domains 161 and 162 to attain effects equivalent to those of "wedge-prism method" or "double-knife edge method". In an optical head optics shown in FIG. 1b, a laser beam such as infrared beam or visual beam emitted from a laser source 1 passes through the hologram element 16 and lens 3 and irradiates the surface of an optical disk 4. A reflected beam from the optical disk passes through the lens 3 and element 16, whereby the diffracted beams are detected by a beam detector 15 so as to be used for focusing control, tracking control and the like. Light spots incident upon the photodetector 15 are diagrammatically shown in FIG. 1c. The hologram element prepared in the above manner can advantageously act as an aberration-free hologram lens for a wavelength limited to the design wavelength $\lambda_2$ of the laser source 1 used and even in the event that an aberration due to a slight variation in wavelength of the laser source appears as the beam shift on the photoelectric conversion surface of the beam detector or photodetector 15, four photoelectric conversion domains 151, 152, 153 and 154 which can conveniently be operated in push-pull fashion suppress the varriation to a practically satisfactory extent.

However, the prior art optics using the hologram element 16 is disadvantageous in that in order to focus a small spot upon the linear domain-boundary (B in FIG. 1c) of the photodetector 15, the position of the spot has to be adjusted correctly within a range of ± several microns relative to the photodetector 15 as in the case of the usual optical system. In an astigmatic aberration type system in which astigmatic aberration wave fronts are detected by a four-domain or -element (quadrant) detector 15 as shown in FIG. 1c, the same difficulties are encountered in performing accurate final adjustment of the photodetector 15. In this connection, one may refer to, for example, "A Multi-functional Reflection Type Grating Lens for the CD Optical Head" by K. Tatsumi et al, Proc. of the International Symposium on Optical Memory, Tokyo, Sept. 16–18, 1987 (p. 127) and U.S. Pat. No. 4,731,722 to Wai-Hon Lee entitled "Optical head using hlogram lens for both beam splitting and focus error detection functions" issued May, 1988.

Further, in making an attempt to integrally form the light source (semiconductor laser) and the photodetector in the conventional OPUH apparatus using the holographic element, the position of the photodetector relative to the light source must also be adjusted with high accuracy.

In the conventional optics using a diffraction grating (knife edge method), an unwanted diffraction beam is produced from the diffraction element 16 irradiated with the light source 1, though not illustrated in the conceptive diagram of FIG. 1b, and focused by the lens 3 upon the surface of the optical disk 4 to form an unwanted diffraction spot image. The unwanted spot is a small spot like the 0-order diffraction beam spot and in a write-once type or erasable type optical disk, its intensity is too high to be neglected and degrades the S/N ratio upon signal recording or reading.

SUMMARY OF THE INVENTION

An object of this invention is to provide a compact, light and highly reliable OPUH apparatus which is suitable for mass production.

To accomplish the above object, an OPUH apparatus according to the invention comprises, in an optical system of the OPUH apparatus, a hologram having an off-axis Fresnel-zone-plate like pattern which exhibits lens function to provide relatively long positive and negative focal lengths for the same diffraction order, and two three-element photodetectors for receiving double focal-beams, which stem from the hologram irradiated with a reflected beam from an optical disk and which pass through a focusing lens, on the photodetector surfaces being flush or coplanar with the focal plane of the focusing lens, so that the double-focal beams are differentially detected by the photodetectors to provide a focusing error signal and like signal. The direction of two surface-area dividing boundaries of respective photodetectors is made to be coincident with or substantially parallel to the direction of a line radially extending from a focal point of the 0-order diffracted beam from the hologram, thereby ensuring that the influence of variation in the wavelength of the light source as well as the influence of mechanical error due to assembling can be suppressed. Diffracted beams from the hologram always converge, in defocused state, on the pit surface of the optical disk and so the apparatus can operate without degrading the S/N ratio upon recording and reading.

BRIEF DESCRIPTION OF THE DRAWINGS

FIG. 4b conceptually schematically illustrates a photodetector arrangement to be used in the FIG. 4a embodiment in place of that shown in FIG. 4a;

FIG. 9b is a sectional view of FIG. 9a;

DESCRIPTION OF THE PREFERRED EMBODIMENTS

Figure 2A:
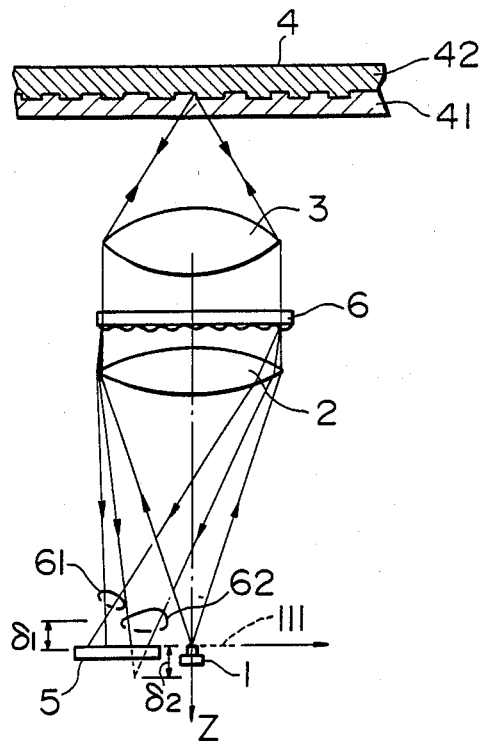
FIG. 2a is a schematic diagram illustrating an OPUH apparatus according to an embodiment of the invention.

FIG. 2a schematically illustrates an OPUH apparatus according to an embodiment of the invention. Referring to FIG. 2a, the OPUH apparatus comprises a semiconductor laser 1 for emitting a coherent beam having a wavelength $\lambda_2$ of, for example, about 800 nm falling within the infrared region or a region of shorter wavelengths than infrared rays, a collimating lens 2 having a focal length $f_c$ of about 20 mm, and an objective lens 3 for focusing. The spherical beam emitted from the light source 1 is converted by the collimating lens 2 into a parallel beam which is focused upon an optical storage medium (optical disc) 4 by means of the lens 3. Interposed between the lenses 2 and 3 is a diffraction optical element 6 that can produce two focal points in the off-axis region. On the forward path, the 0-order diffracted; mission light transmitting through the diffraction element 6 is focused upon the disk 4. This disk 4 is comprised of a substrate 42 and a protection layer 41. On the backward or return path, the beam reflected from the disk 4 passes through the lens 3 so as to be converted into a substantially parallel beam which in turn impinges upon the diffraction element 6, so that in addition to the 0-order transmission light, off-axis double wave fronts 61 and 62 of different curvatures are generated.

Figure 2B:
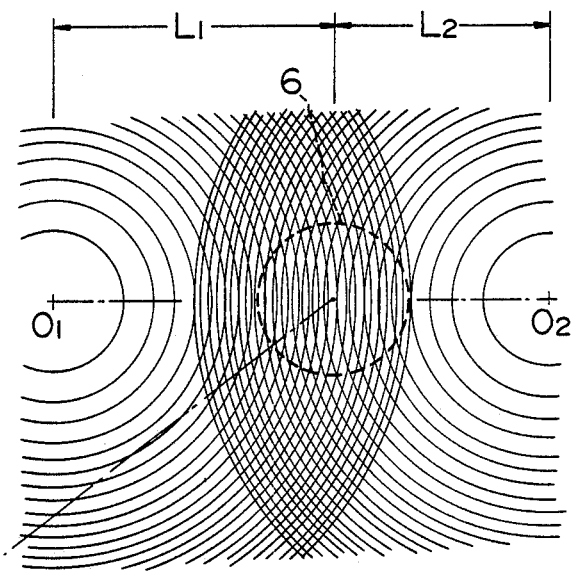
FIG. 2b is a diagram conceptually illustrating the relation between diffraction element and photodetector in the FIG. 2a embodiment.
Figure 2B:
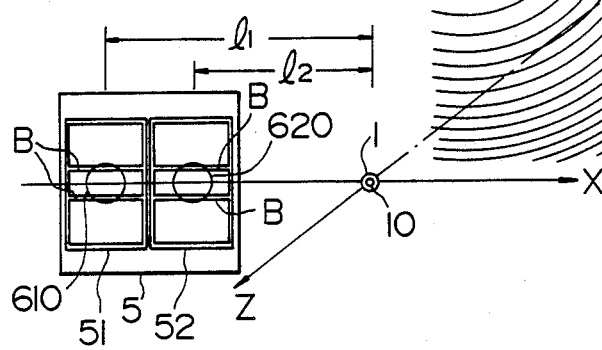

These diffracted wave fronts are respectively focused by the collimating lens 2 upon two planes in the one half of the off-axis region which are respectively located forwardly and backwardly of a plane 111 that contains a focusing point for the 0-order diffracted light, i.e., an emitting point of the light source 1 and is vertical to the optical axis Z of the lens 2. The apparatus also comprises a photodetector 5 for receiving light which includes three-element photodetectors 51 and 52 as shown in FIG. 2b. The focal plane for the wave front 61 is $\delta_1$ (absolute value) distant from the plane 111 and that for the wave front 62 is $\delta_2$ (also absolute value) distant from the plane 111, and $\delta_1 = \delta_2 = \delta$ is determined in design. But when compared with, for example, the distance between the two astigmatic focal lines in the astigmatic method, $\delta_1 + \delta_2$ can be a few times larger and $\delta_1 \neq \delta_2$ can be permitted with a relatively large tolerance. Conjugate images are formed in the other half of the off-axis region but they are not illustrated in FIG. 2a.

FIG. 2b particularly illustrates the relation between the emitting point 10 and each of the first and second photodetectors 51 and 52 located on the plane 111. The wave front 61 results in an incident beam 610 upon the photoelectric conversion surface of the photodetector 51 and the wave front 62 results in an incident beam 620 upon the photoelectric conversion surface of the photodetector 52. These beams respectively bridge linear element-boundaries B and are aligned on the X axis which is a straight line passing through the emitting point, as shown in FIG. 2b. The OPUH in accordance with the invention differs from the prior art OPUH using a diffraction element in such points as the configuration of domain of the sub-detector, the pattern (Fresnel-zone-plate) of the diffraction element and the positional relation between photodetector and diffraction element, so as to be well adapted to attain special advantages. For convenience of explanation, centers $O_1$ and $O_2$ of two Fresnel-zone-plate like patterns of the diffraction element 6 are illustrated in FIG. 2b but the element 6 is used at a portion surrounded by dotted circle. The line $\overline{O_1 O_2}$ is parallel to the X axis. The photodetector featured by the invention will be detailed later with reference to FIGS. 5a to 5c.

Figure 3:
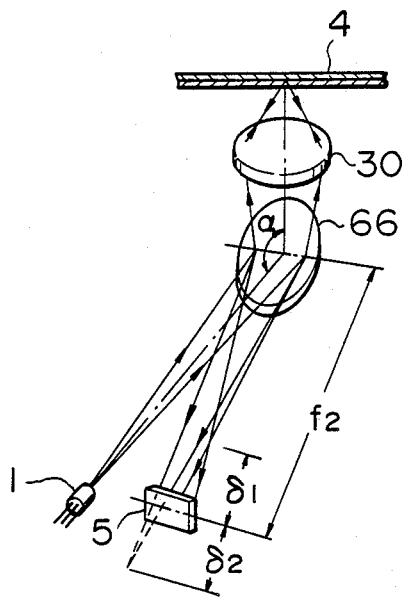
FIG. 3 is a diagram for explaining the principle of another embodiment of the invention.

FIG. 3 is a diagrammatic representation illustrative of the concept of another embodiment of the invention. While the transmission type diffraction element is used in the first embodiment, a reflection type diffraction element 66 is used in this embodiment to bend the optical axis by an angle $\alpha$ nearly equalling 90°. In this case, the Fresnel-zone-plate pattern is not circular but is elliptical in which the ratio between major and minor axes approximates 1.4:1. However, the circular Fresnel-zone-plate pattern, though suffers from an astigmatic aberration, may also be used practically satisfactorily in this embodiment. The imaging optics in this embodiment can be devoid of the collimating lens and can be formed of an objective lens system 30 alone to realize compactness of the apparatus and reduce the number of parts.

Figure 4A:
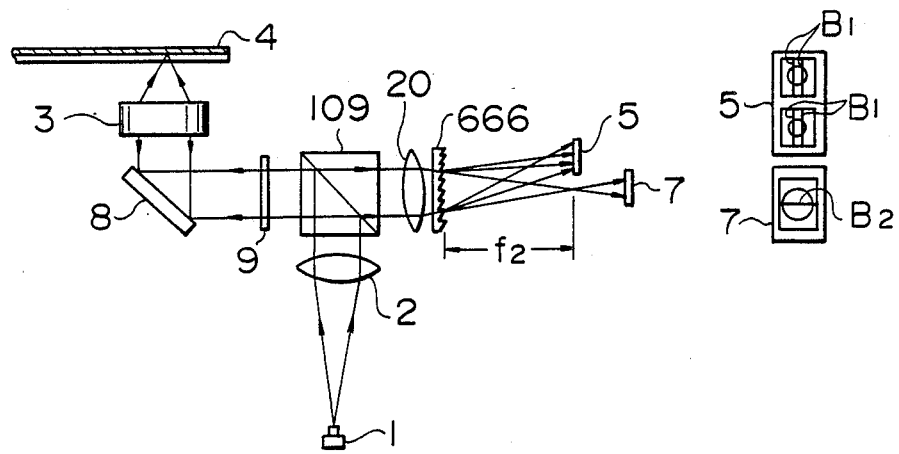
FIG. 4a is a schematic diagram illustrating an OPUH apparatus according to still another embodiment of the invention.

FIG. 4a schematically illustrates a further embodiment of the invention which differs from the previous two embodiments in that a polarized beam spliter 109 and a quarter wavelength plate 9 are provided with the view of obtaining control beams on a return path separated from a forward path starting from a light source 1, and that a third photodetector 7 of two domains is exclusively used for tracking detection. In this case, the optical system is arranged in such a manner that the direction of the track groove in optical disk projected on the surface of the photodetector 7 is orthogonal to the linear element-boundary $B_1$ of the photodetector 5. Thus, by detecting signals while rendering the direction of a linear domain-boundary $B_2$ of the two-element photodetector 7 coincident with the direction of the projected track groove, noise (offset) due to crossing of the beam across an optical disk groove can be suppressed for the sake of detection by the focusing error detector, thus ensuring that accurate focusing control can be performed and the actuator can be operated with minimal power consumption. The wavelength plate 9 is preferentially designed as $\lambda/5$ plate to facilitate performance balance between wavelength plate 9 and polarized beam splitter 10 and optimize the quantity of return light, thereby maximizing the S/N ratio for signal detection. A mirror 8 is adapted to bend the optical path. In this embodiment, a hologram 666 may preferably be blazed to maximize the diffraction efficiency.

Figure 4B:
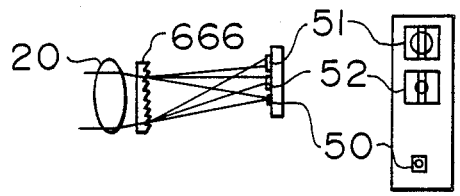

As shown in FIG. 4b, the photodetectors 51 and 52 and a photodetector 50 dedicated to detection of RF signals may be integrated on the focal plane of a focusing lens 20.

Figure 5A:
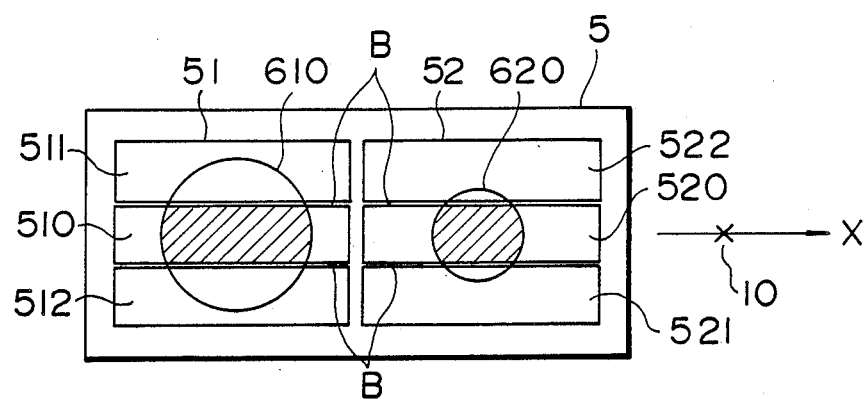
FIGS. 5a to 5c are diagrams useful in explaining the operation of the photodetector in respect of three focusing states of beams.
Figure 5B:
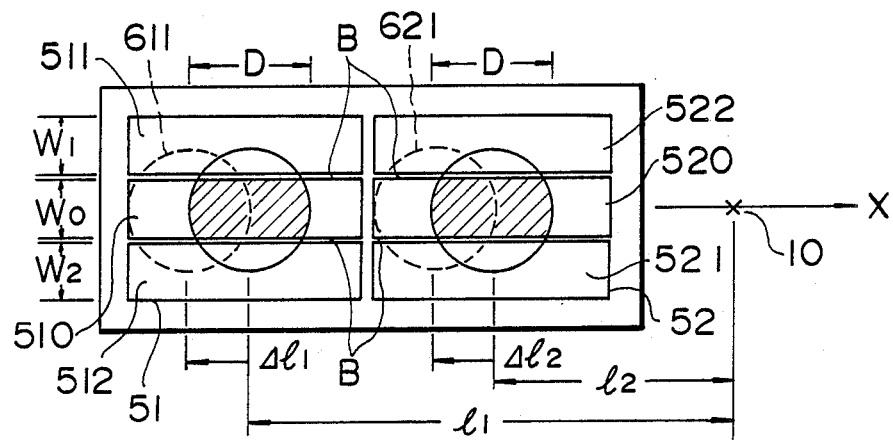
Figure 5C:
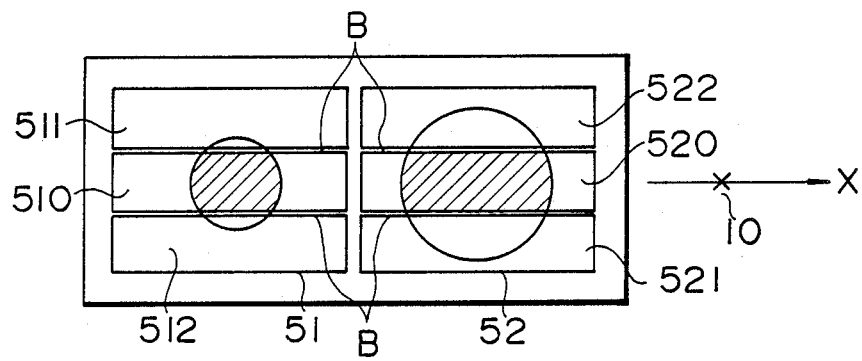

The construction of the photodetector used in the foregoing embodiments will now be described in greater detail. FIGS. 5a to 5c diagrammatically show the relation between the beams 610 and 620 detected on the elements of the photodetectors 51 and 52 shown in FIG. 2b. Particularly, when an in-focus spot is formed on the disc, the beams 610 and 620 having identical diameter and optical power density can be obtained as shown in FIG. 5b and these beams are subjected to photoelectric conversion. As a result, an output signal detected from one of three elements 510 of the detector 51 equals an output signal detected from one of three elements 520 of the detector 52 and the differential output signal becomes zero. Accordingly, where an output signal from each domain j is represented by $S_j$, a focusing error signal $F_E$ is given by $$F_E = S_{510} - S_{520}$$
$$= 0$$

But, preferably, the focusing error signal $F_E$ is obtained from, $$F_E = (S_{510} + S_{521} + S_{522}) - (S_{520} + S_{511} + S_{512})$$

because this differential detection can improve the error signal detection sensitivity (ratio between focusing error and output signal) and linearity, followed by improved light utilization efficiency leading to extremely improved S/N ratio.

When an out-focus or defocusing spot is formed on the disk, the incident light upon the diffraction element 6 is not a plane wave but is, for example, a diverging spherical wave and therefore the focal point for the wave front 61 affected by convex lens action of the Fresnel-zone-plate pattern of the diffraction element approaches the photodetector while the focal point for the wave front 62 affected by concave lens action of the Fresnel-zone-plate pattern leaves the photodetector, as illustrated in FIG. 5c.

Consequently, $$F_E = S_{510} - S_{520} > 0$$

stands or obviously $$F_E = (S_{510} + S_{521} + S_{522}) - (S_{520} + S_{511} + R_{512}) > 0$$

stands.

When an out-focus or defocusing spot is formed on the optical disk in opposite phase relation to the above, the beams are inversed symmetrically to those of FIG. 5c as illustrated in FIG. 5a and $$F_E = S_{510} - S_{520} < 0$$

or $$F_E = (S_{510} + S_{521} + S_{522}) - (S_{520} + S_{511} + S_{512}) < 0$$

stands. The linear element-boundaries B of each detectors are parallel to the X axis passing through the focal point 10 for the 0-order diffraction beam and individual beams appearing in each state described above moves along the linear element-boundary B in the X-axis direction when the wavelength of the light source varies. This movement is exemplified at dotted-line circles in FIG. 5b. It will be appreciated that the movement of the beams is due to the parallelism of the line connecting centers $O_1$ and $O_2$ of the zone-plate like patterns of diffraction element 6 to the X axis as shown in FIG. 2b.

Where the focal distance $f_2$ of the collimating lens is 20 mm and the aperture size thereof is 5 mm, an example of design parameters is such that $W_0 = W_1 = W_2 = 0.05$ mm is for each element, the distances $l_1$ and $l_2$ from the point 10 to the element centers are 1 mm and 0.65 mm, respectively, the beam diameter D corresponding to the in-focus spot is 0.10 mm, and $\delta_1 = \delta_2 = 0.4$ mm.

In actual OPUH apparatus, it suffices that a focusing variation amount of about ±100 μm on the photodetector surface corresponding to a defocusing amount of about +5 μm on the optical disk surface is designed for the main operating range and therefore the diameter of beams in FIGS. 5a to 5c can afford to change from a maximum value of about 125 μm to a minimum value of about 75 μm.

Returning to FIG. 2a, the signal pits along tracks are sectioned so as to be illustrated as irregularity in the information recording surface. If the track proceeds in a direction parallel to the sheet of drawing, two beams are respectively converging and diverging wave fronts and far-field patterns of the track groove are in counterphase on the photodetector surface. Accordingly, a tracking error signal $T_E$ can be obtained by calculating, $$T_E = (S_{511} + S_{521}) - (S_{512} + S_{522}).$$

Figure 1A:
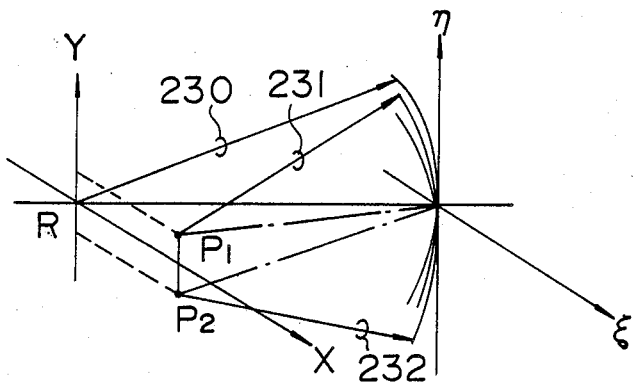
FIG. 1a shows a model of an optics for preparation of a conventional hologram.
Figure 1B:
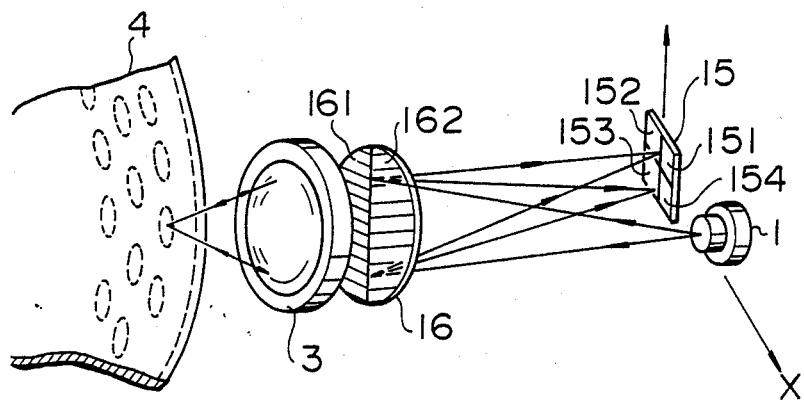
FIG. 1b is a schematic diagram illustrating an optical head optics using the conventional hologram.
Figure 1C:
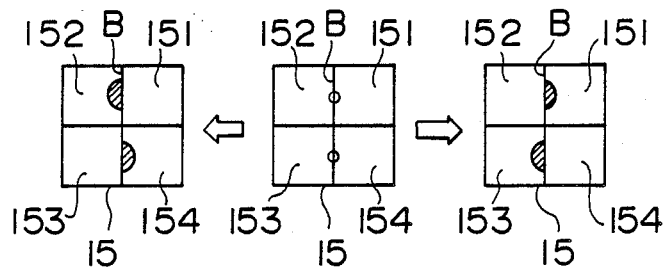
FIG. 1c is a diagram illustrating light spots on a photodetector used in the optics of FIG. 1b.

It will then be appreciated that in accordance with the invention, the mechanical clearance for photodetector can be mitigated considerably in obtaining the focusing error signal $F_E$ and tracking error signal $T_E$ as compared to the case of FIG. 1c.

Generally, when a semiconductor laser is used as the light source, there arises a problem that the wavelength of the beam emitted from the laser shifts in accordance with temperature changes or current changes. In accordance with the invention, the direction of the linear element-boundary B coincides, as shown in FIGS. 5a to 5c, with the direction of the spatial carrier frequency of a partial hologram corresponding to reconstruction of the respective wave fronts having different focal points and therefore no trouble occurs even when the beam shifting as shown at dotted-line circle in FIG. 5b takes place in which the beam 611 shifts by $\Delta l_1$ and the beam 621 by $\Delta l_2$. As the wavelength varies from $\lambda_2$ to $\lambda_2 + \Delta\lambda$, the two beams change in magnification by the same amount which is $$\frac{\lambda_2 + \Delta\lambda}{\lambda_2}$$

and the differential output signal can still remain undisturbed even when the beam diameter changes.

Figure 6A:
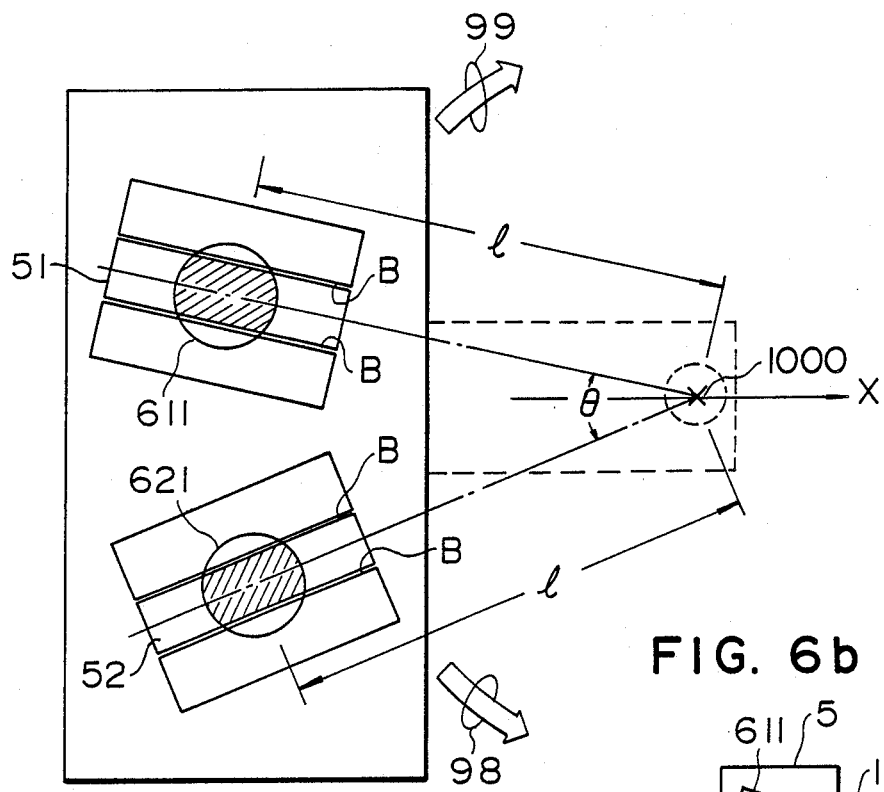
FIG. 6a conceptually schematically illustrates another embodiment of photodetector arrangement according to the invention.

FIG. 6a illustrates another arrangement of photodetectors which can be used for the OPUH apparatus according to each embodiment of the invention. This arrangement differs from the arrangement of FIGS. 5a to 5c in that centers of first and second photodetectors 51 and 52 are both l distant from the emitting point 1000, and that linear element-boundaries B of the first and second photodetectors are parallel to lines which extend radially from the point 1000 and make a predetermined angle $\theta$ between the lines. In this case, two off-axis Fresnel-zone-plate patterns are symmetrical with respect to a vertical bisector for a line segment connecting centers $O_1$ and $O_2$ of the two patterns, as shown in FIG. 8b, and advantageously an absolute value of diffraction angle variation corresponding to the light source wavelength variation is the same for the two beams. Accordingly, when a light source liable to greatly vary in wavelength is used, l is designed to be minimal. Further, the two wave fronts can easily be made to be severely identical to each other in beam intensity.

Figure 6B:
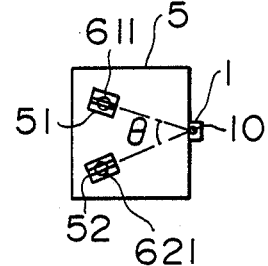
FIG. 6b conceptually illustrates integral formation of the photodetector and light source for use in the FIG. 6a embodiment.

By slightly rotating the diffraction element or the photodetectors about a rotation center 1000 substantially coincident with the emitting point 10 as indicated at arrow 98 or 99 in FIG. 6a, the relation between the diffraction element or photodetector and the position of beams 611 and 612 angularly separated from each other by $\theta$ can be adjusted with ease as in the case of FIGS. 2a and 2b. In an example wherein the photodetector 5 and the semiconductor laser 1 are integrally formed, they are located in positional relationship as diagrammatically shown in FIG. 6b. Where $\theta \simeq 45°$, $l \simeq 1$ mm and beam diameter $D \simeq 0.1$ mm, it suffices that the emitting point 10 of light source is settled at a design location with a mechanical accuracy of about 0.1 mm, and the integral formation of the light source and photodetector can be realized more easily as compared to the case of $\theta \simeq 0$. This is particularly advantageous for manufacture of the above integral parts by using automated machines. Further, by taking into consideration of the positional errors of the laser diode 1 assembled with the photodetector 5, it is practically possible or recommended to design the boundary intersecting angle $\theta$ between nearly zero and that of the directions of the element boundaries such as illustrated in the Figure, i.e., $0 \lesssim \theta' \leq \theta$.

Figure 7:
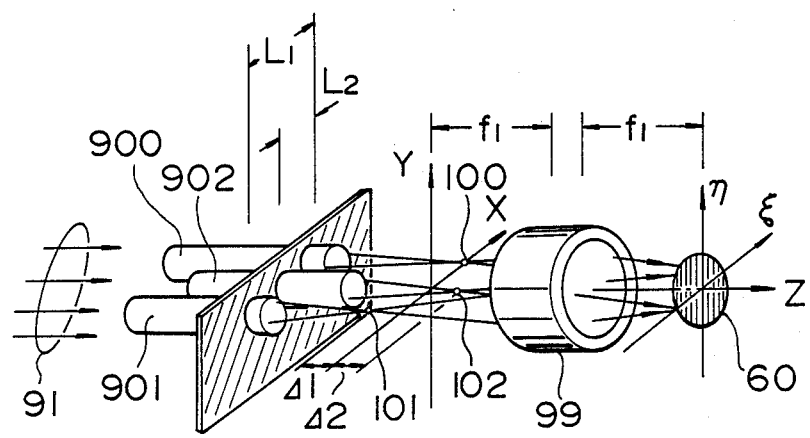
FIG. 7 is a schematic diagram illustrating an example of a recording optics for preparation of a hologram used as a diffraction element according to the invention.

FIG. 7 is a diagrammatic representation illustrative of the concept of an example of an optics for recording a Fourier transform hologram used as the diffraction element in each embodiment of the invention.

A coherent plane wave 91 incident upon graded index rod-lenses 901, 902 and 900 is focused on predetermined spatial positions 101, 102 and 100 and then the differently focused beams pass through a Fourier transform lens 99 so as to superpose each other on a recording medium 60, thereby forming a Fourier transform hologram The Fourier transform hologram, characteristics of which are reported and analyzed in detail in, for example, a literature "Speckle reduction in holography—" by M. Kato et al, Appl. Opt., 14 (1975) 1093, has been applied practically to a recording/reproduction optics for general images (see "Optical Chinese character edition/processing system" by Sato et al, Research Data, The Institute of Electronics and Communication Engineers of Japan, EC 78-53 (1978) 47). The literature is herein incorporated by a reference as part of this disclosure. Particularly, in a Fourier transform hologram used in the present invention, it suffices that Fourier transform is valid for reconstructed wave fronts near the optical axis to an extent that the function of the hologram as a beam control means is not disturbed practically. Accordingly, the lens used for reconstruction of wave fronts from the hologram element may be replaced with the collimating lens or alternatively, by simply irradiating a converging spherical wave on the hologram element, a desired reconstructed image can also be obtained on a focal plane of the hologram element.

In the recording optics shown in FIG. 7, Z-axis distance $\Delta_1$ between focal point 101 and X axis and Z-axis distance $\Delta_2$ between focal point 102 and X axis can be designed as follows:

$$M^2\Delta_1 = \delta_1, \quad M^2\Delta_2 = \delta_2,$$

$$\delta_1 = \delta_2, \quad M = \frac{\lambda_2}{\lambda_1} \cdot \frac{f_2}{f_1}$$

where M is magnification, $f_1$ is the focal distance of the recording Fourier transform lens 99, and $f_2$ corresponds to the focal distance of reconstruction Fourier transform lens which is represented by focal distance of the collimating lens 2 in FIG. 2a and by radius of curvature $f_2$ of a converging wave incident upon the hologram in FIG. 3. Distances $L_1$ and $L_2$ between optical axes of the rod-lenses are respectively related to $l_1$ and $l_2$ in FIG. 5b by $ML_1 = l_1$ and $ML_2 = l_2$. Where the focal distance $f_1$ of the recording Fourier transform lens approximates 50 to 100 mm, $L_1$ and $L_2$ approximate 1 to 2 mm for the purpose of dimensional matching with the optical head optics and photodetector system described in connection with FIGS. 2a to 4b. With an ordinary lens optics, a desired hologram is difficult to obtain but a rod-lens of about 1 mm diameter is easy to realize, thus facilitating preparation of a desired hologram.

Figure 9A:
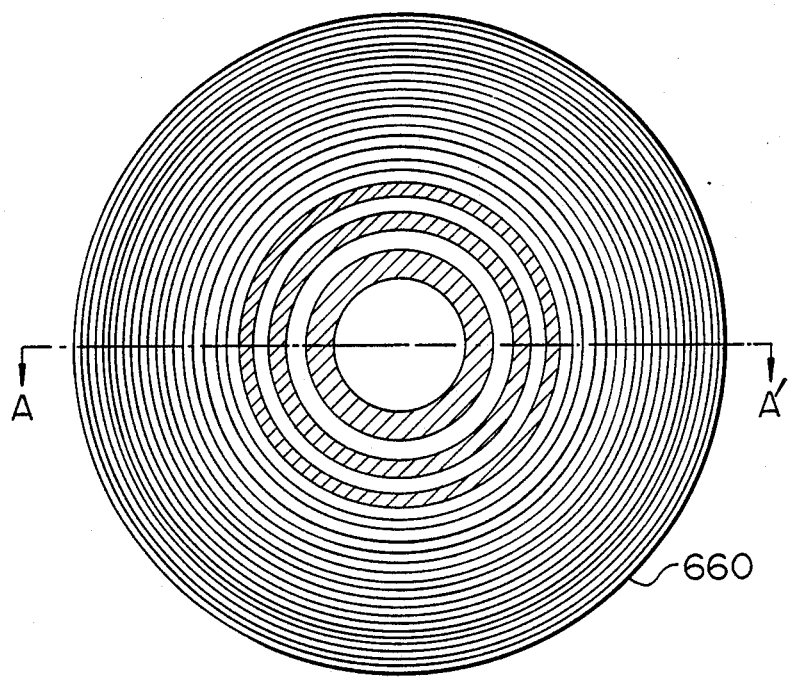
FIG. 9a is a plan view of a phase-type diffraction element.
Figure 9B:
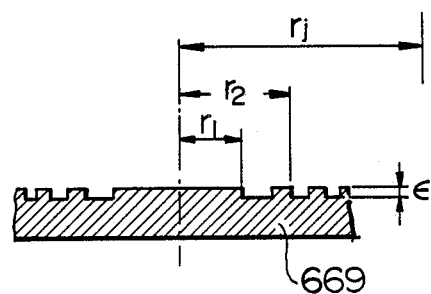

In this way, the hologram used as the diffraction element having the Fresnel-zone-plate pattern can be prepared using the laser interferometric optics. But, as well known in the art, the Fresnel-zone-plate can also be drawn in the form of a concentric zone pattern by using a method other than the interferometric method. Taking a single Fresnel zone 660 diagrammatically illustrated in FIG. 9, for instance, radius $r_j$ of zones constituting the single Fresnel zone having focal distances $\pm f_z$ is given by $$r_j = \sqrt{2j\lambda f_z + j^2\lambda^2} \tag{1}$$

where $\lambda$ is wavelength of the light source. A phase-type zone plate in the form of a phase plate 669 having a step $\epsilon$ in a section on the line AA′ of FIG. 9a as illustrated in FIG. 9b can be obtained and used as a diffraction element like a phase-type hologram having high diffraction efficiency.

Figure 8A:
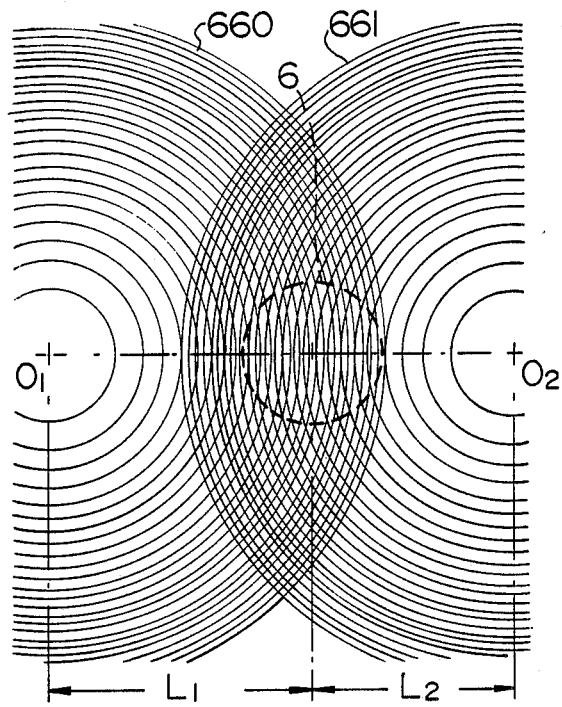
FIG. 8a conceptually illustrates a superposed zone-plates pattern corresponding to a pattern obtained by the FIG. 7 optics.
Figure 8B:
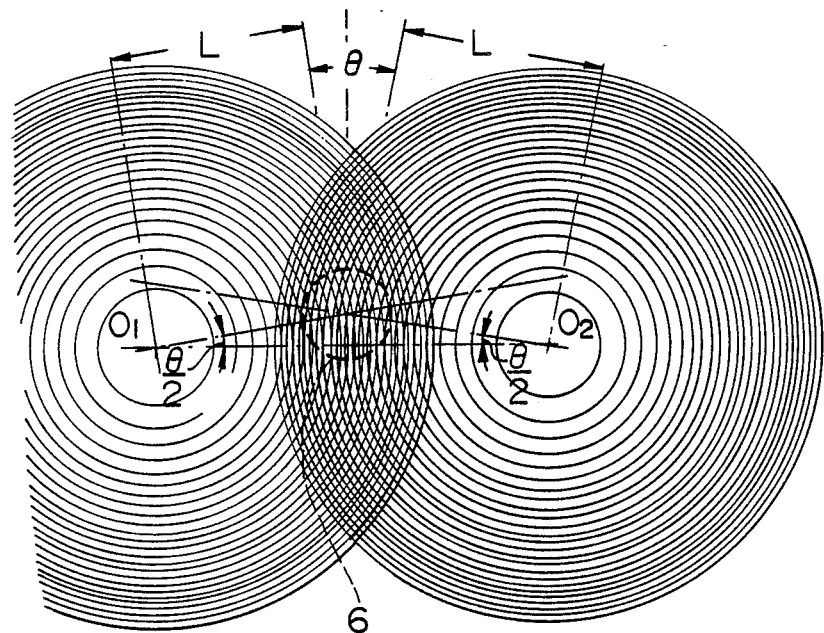
FIG. 8b conceptually illustrates another diffraction element pattern according to the invention.

FIG. 8a illustrates two zone patterns, as designated by 660 and 661, each corresponding to the hologram prepared through the interferometric optics, with the two patterns separated from each other by a predetermined distance ($L_1 + L_2$) to overlap each other. However, an area within dotted-line circle, as designated at 6, is actually used such patterns, like a mask pattern used in the fabrication process of semiconductor devices, can be drawn directly using the computer output. The pattern of FIG. 8a is used as a mask for photoetching to form a phase-type diffraction element 6 as shown in FIG. 9a which can be used as the diffraction element 6 in the optical system of FIG. 2a. The phase-type diffraction element 6 having its surface coated with a film of metal such as aluminum or gold or a multi-layer dielectric thin film may be used as the reflection-type diffraction element in FIG. 3. It is however noted that for simplicity of explanation, FIG. 9a illustrates only a partial pattern (single zone plate). FIG. 8b conceptionally shows a diffraction element pattern used in combination with the photodetector arrangement shown in FIG. 6. In addition to the above, various types of Fresnel-zone-plate can be designed and prepared depending on the type of optics and can be combined with electron beam graphics, as necessary, to obtain a highly precise Fresnel-zone pattern.

Figure 10:
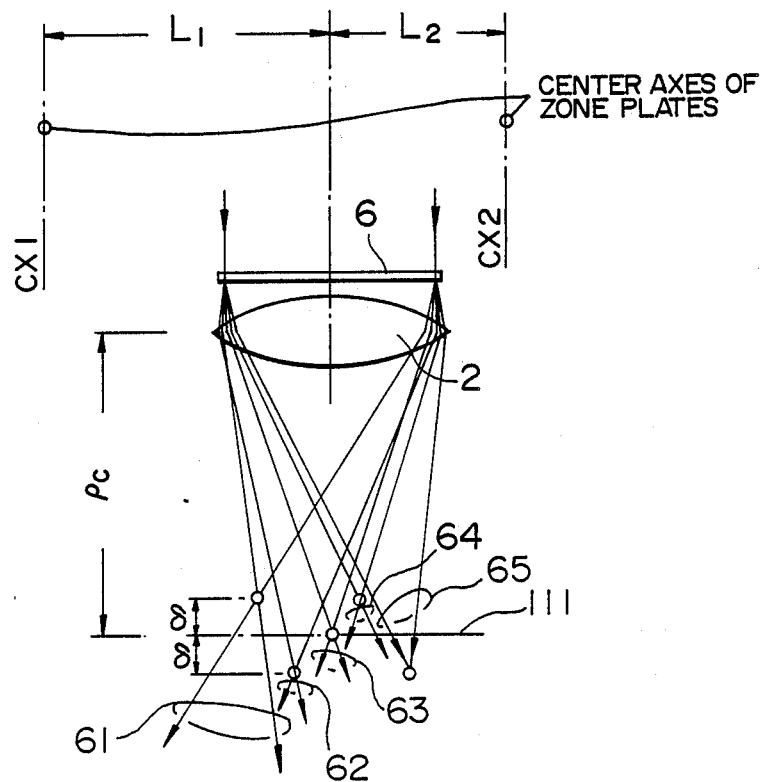
FIG. 10 is a diagrammatic representation for explaining 0-order and ± first-order diffraction beams.

Referring to FIG. 10, a diffraction element 6 prepared on the basis of the double zone pattern shown in FIG. 8a is combined with a collimating lens 2. When the diffraction element 6 is irradiated with a parallel coherent beam, 0-order and $\pm$ first-order diffraction waves are produced. The $\pm 1$ first-order diffraction beams (diverging and converging beams) from the respective zone patterns are diffracted waves corresponding to virtual images on optical axes respectively distant from the optical axis of the lens 2. The diffraction waves are focused by the lens 2 to form light fluxes 61, 62, 64 and 65. Light flux corresponding to the 0-order diffraction beam is designated by 63. To meet the first embodiment of the invention (FIGS. 2a and 2b), the light fluxes 61 and 62 are detected by the first and second photodetectors, respectively. The distances $L_1$ and $L_2$ in FIG. 10 correspond to $l_1$ and $l_2$ in FIG. 5b and are determined by the focal distance $f_c$ of lens 2 and the focal distances $\pm f_z$ of zone plate. CX1 and CX2 indicate center axes of zone plates. The Fresnel-zone-plate prepared by graphics is more vulnerable to wavelength variation to cause a slight chromatic aberration than the Fresnel-zone-plate in the form of the Fourier transform hologram, but it has advantages of (i) long focal distance, (ii) ability to be used with a differential detection system and (iii) signal detection in the far field and ability to realize the function of an auxiliary lens for forming two focal points which are forwardly and backwardly of the focal plane of the focusing lens, and it can be used for realizing an OPUH apparatus which is practically satisfactory. The relation between $f_c$ and $f_z$ (more strictly, $f_z$ represents focal distances $\pm f_{z1}$ and $\pm f_{z2}$ of the two zone plates) can be indicated in accordance with the simple geometrical optics as follows:

$$\frac{1}{-f_{z1}} + \frac{1}{f_c - \delta} = \frac{1}{f_c} \tag{2}$$

and $$\frac{1}{f_{z2}} + \frac{1}{f_c + \delta} = \frac{1}{f_c} \tag{3}$$

where $\delta$ is the distance between the photodetector surface and each of under and over-focus images and related to $f_c$ by $2\delta < f_c$. Values of $f_{z1}$ and $f_{z2}$ depend on a pattern designed pursuant to equation (1) and a wavelength used. Especially where the objective lens 3 in FIG. 2a has a focal distance $f_0$, $f_0 << f_{z1} \approx f_{z2} = f_z$ stands and equations (2) and (3) can be approximated by, $$\frac{1}{f_c} + \frac{1}{f_z} = \frac{1}{f_c - \delta}$$

and $$\frac{1}{f_c} - \frac{1}{f_z} = \frac{1}{f_c + \delta},$$

respectively. Obviously, if so desired, a Fourier transform type zone-plate pattern may be synthesized and drawn by means of a computer.

Figure 11:
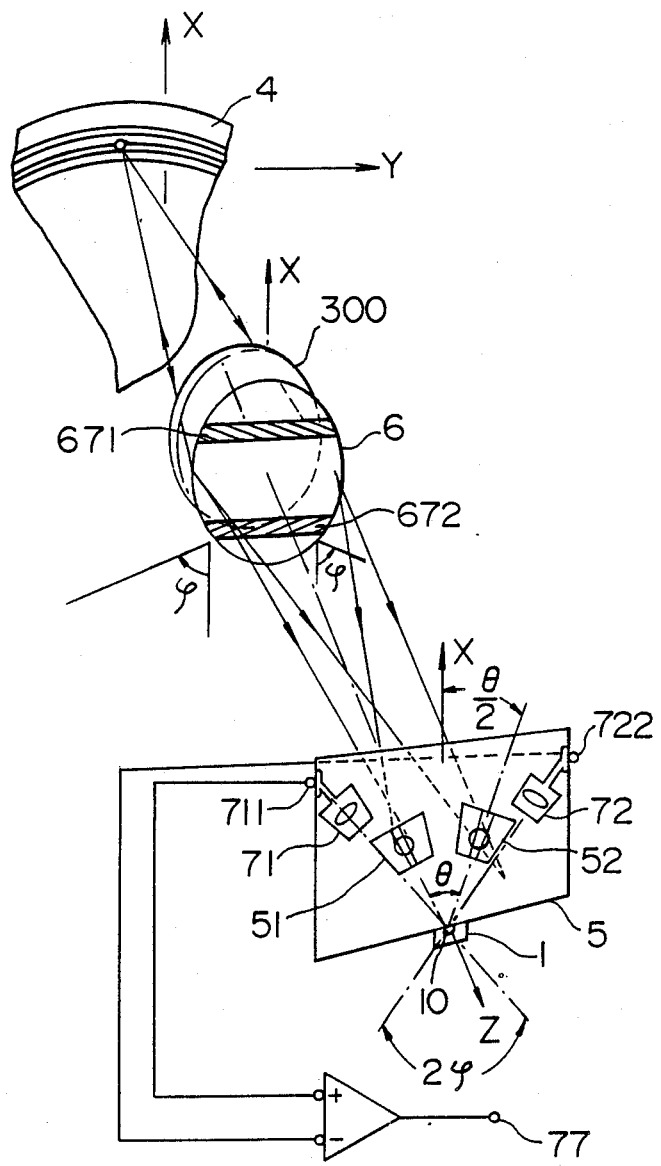
FIG. 11 is a schematic diagram illustrating an OPUH apparatus according to a further embodiment of the invention.

FIG. 11 illustrates conceptionally schematically a CPUH apparatus according to still another embodiment of the invention. Like the embodiment of FIG. 2a, a diffraction element 6 is disposed in a coherent beam emitted from a light source 1 and on the backward optical path, two-focal-point images are detected by three-element photodetectors 51 and 52, respectively. This embodiment is identical to the FIG. 2a embodiment with the exception that (i) an imaging optics is devoid of the collimating lens 2 and comprised of only an objective lens 300, (ii) slit-like grating areas 671 and 672 are formed on the surface of the diffraction element 6 wherein diffraction gratings at predetermined pitches are formed in the respective areas obliquely by making angles $+\phi$ and $-\phi$ to X axis, respectively, and (iii) photodetectors 71 and 72 are the three element photodetectors 51 and 52 are integrated on the same chip. The direction of tracks in an optical disk 4 coincides with the Y-axis direction near the beam focusing point and the direction of the two grating areas 671 and 672 also coincides with the Y-axis direction substantially. The pattern of the diffraction element 6 is the same as the pattern 6 in the circular aperture shown in FIG. 8b and the line segment $\overline{O_1O_2}$ in FIG. 8b is substantially parallel to the X axis in FIG. 11. With this contruction, since the tracking signal can be picked up from a slit aperture at a position where the far-field pattern of the track groove changes maximally on the diffraction element surface, a stable tracking error signal can be produced from a differential output circuit 77 of the photodetectors 71 and 72. Accordingly, there is no need of separating the tracking error signal from the three-element photodetectors 51 and 52 and when the absolute value of angles $\pm\theta/2$ subtended by the linear element-boundary of respective photodetectors 51 and 52 and the X axis is designed to be $\theta \lesssim 45°$, noise due to crossing of the beam across the groove and contained in the focusing error signal can be suppressed remarkably.

Figure 12A:
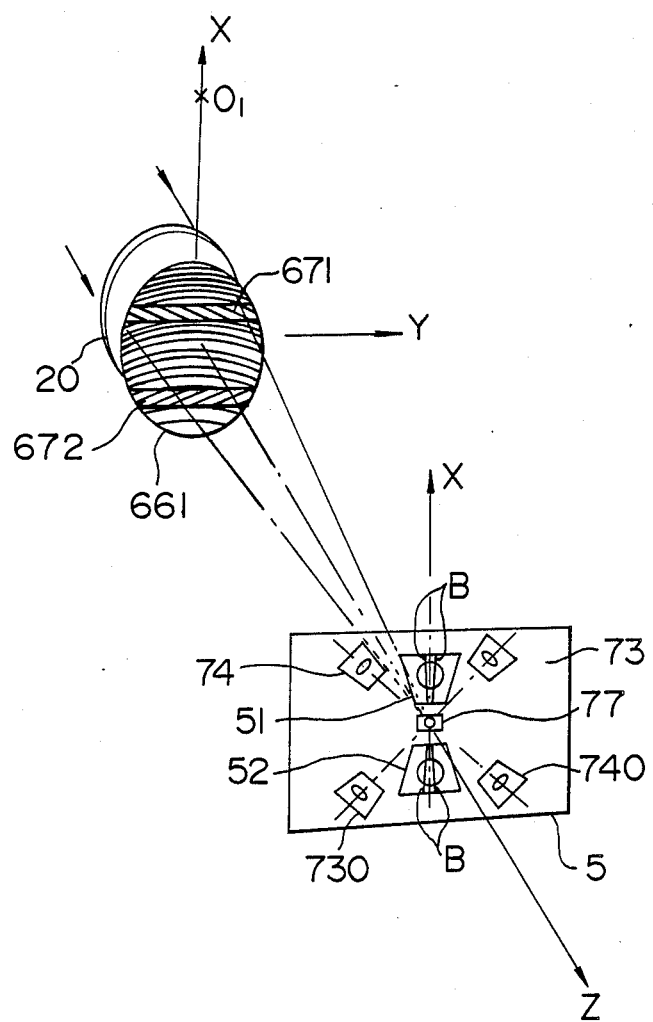
FIG. 12a is a similar view illustrating an OPUH apparatus according to a further embodiment of the invention.

FIG. 12a schematically illustrates a CPUH apparatus according to a further embodiment of the invention. In this embodiment, part of a single zone plate as shown in FIG. 9a substitutes for the diffraction element 666 shown in FIG. 4a to form a diffraction element 661 having, in its aperture, slit-like grating areas 671 and 672. In this embodiment, the linear element-boundary B of each of the three-element photodetectors 51 and 52 is parallel to X axis which connects optical axis Z and zone plate center 0 and mutually conjugate two-focal-point images due to the convex and concave lens functions of the single zone plate are differentially detected to provide a focusing error signal. A central photodetector 77 located near the optical axis is used for RF detection. Other diffraction beam components stemming from the slit-like grating areas are detected by photodetectors 73, 74, 730 and 740 and a tracking error signal $S_T$ is given by, $$S_T = (S_{74} + S_{740}) - (S_{73} + S_{730}).$$

Figure 12B:
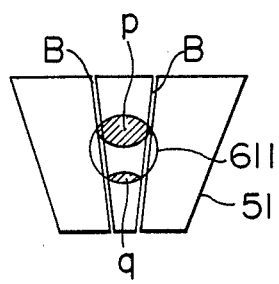
FIG. 12b illustrates a beam on the photodetector in the FIG. 12a embodiment.

In this embodiment, the direction of the track groove projected on the surface of photodetector can be set so as to accurately coincide with the Y-axis direction and even in the event that there occur as shown in FIG. 12b offsets of far-field pattern distribution of the track groove (hatched areas p and q) which are superimposed on a beam 611 bridging two linear element-boundaries B of the three-element photodetector, the differential output will not be affected by the offsets. Further, the focusing detection pattern in the form of the single zone plate according to this embodiment can be simpler than the pattern used for taking out four first-order diffraction beams from two zone plates and the light utilization efficiency can advantageously be high.

While the embodiments of FIGS. 11 to 12b are described by referring to the slit-like grating areas 671 and 672, a grating pattern being able to maintain the radius of curvature of a wave front incident upon the diffraction element 6 and to change only the travelling direction of the wave front may be formed to cover the entire area of the diffraction element 6, as well known in the art of holography.

As described above, in the OPUH apparatus according to the invention, a plurality of wave fronts produced from the diffraction element are used for light beam control and far-field patterns of a spot focused on the optical disc are differentially detected by means of the photodetectors, thereby attaining the following meritorious effects.

(i) While in the prior art apparatus the diffraction element plays the part of a beam splitter and the higher order diffraction component including $\pm$first-order diffraction components appearing on the forward path is focused on the optical disk, the defocusing pattern occurs in the present invention to reduce power density by orders of two as compared to the prior art example to thereby prevent unnecessary recording and defective servo operation.

(ii) A weak point inherent in production of control beams by the diffraction element, that is, vulnerability to variation in the wavelength of light source can be eliminated in accordance with the invention by making the linear boundary of the photodetector coincident with the direction of the spatial carrier frequency of a partial hologram corresponding to each spot image and by differentially detecting the control beams.

(iii) In contrast to the prior art wherein the positional adjustment of the photodetector is generally required to be performed with extraordinarily high accuracies in any of three axial directions, the present invention can mitigate requirement of accuracies remarkably and besides permit fabrication of a highly reliable OPUH apparatus through such a simplified adjusting process as rotating the diffraction element or photodetector.

(iv) The diffraction element used in the present invention is of a simple superposed zone-plates type and many diffraction elements of high diffraction efficiency can be duplicated with extremely high accuracies.

(v) An optical disc driver using the OPUH apparatus of the invention fulfilling the above advantages can operate stably with a light source of semiconductor laser even in environments where the temperature varies to a great extent.

(vi) A compact solid-state light source such as a semiconductor laser can be formed integrally with photodetectors with less mechanical accuracy than that required conventionally, and the use of the integrally formed parts can simplify the fabrication process of OPUH apparatus and improve reliability of the overall apparatus.

(vii) The prior art faces a problem that offset components due to the influence of the diffraction pattern image corresponding to the track groove are superimposed, as noises, upon the focusing detection signal. The present invention, however, permits remarkable noise suppression by making the direction of the linear boundary of photodetector substantially orthogonal to the direction of the track groove projected on the photodetector surface.

(viii) In the conventional focusing detection based on differential detection of two-focal-point images, two different detection surfaces are used or the images are detected on a single detection surface of a photodetector having a simple, single aperture. Contrarily, the present invention uses two photodetectors of three-domain structure, preferably, in an integrated form to thereby widen the dynamic range of focusing detection, improve the utilization efficiency of light flux and ensure simultaneous detection of a tracking detection signal.

Thus, the present invention can provide a novel OPUH apparatus which is compact, light, highly reliable, inexpensive and suitable for mass production.

We claim:

1. An optical pickup head apparatus comprising:
   a light source for emitting a coherent beam or a quasi-monochromatic beam;
   an imaging optics for focusing the coherent beam or quasi-monochromatic beam into a small spot;
   a diffraction element, disposed in an optical path on which the coherent beam or semi-monochromatic beam passing through said optics is reflected from a given optical storage medium or diffracted thereby, for producing two wave fronts of the same diffraction order and of different focal points in off-axis directions relative to the optical axis of said optics; and
   first and second photodetectors each having a plurality of photodetecting element boundaries extending in an-optional direction between one direction coincident with and another direction substantially parallel to a radial line with a center located at a focal point of a 0-order diffraction beam produced from said diffraction element, for receiving said two wave fronts on their coplanar detection surfaces near the different focal points.

2. An optical pickup head apparatus according to claim 1 wherein said diffraction element is a Fourier transform hologram.

3. An optical pickup head apparatus according to claim 1 wherein said diffraction element is a reflection type hologram having its holographic surface disposed obliquely to make an angle of about 45° to the direction of the beam emitted from said light source.

4. An optical pickup head apparatus according to claim 1 wherein each of said first and second photodetectors has three elements separated by two linear element-boundaries extending in a direction which is coincident with or substantially parallel to a radial line from the center located at a focal point for the 0-order diffraction beam produced from said diffraction element.

5. An optical pickup head apparatus according to claim 1 wherein the direction of a projected track of the optical storage medium on the photodetecting plane is substantially orthogonal to the direction of substantially parallel element boundaries of each of said first and second photodetectors.

6. An optical pickup head apparatus comprising:
   a light source for emitting a coherent beam or a semi-monochromatic beam;
   an imaging optics for focusing the coherent beam or semi-monochromatic beam into a small spot;
   a diffraction element, disposed in an optical path on which the coherent beam or semi-monochromatic beam passing through said optics is reflected from a given optical storage medium or diffracted thereby, for producing two wave fronts of the same diffraction order and of different focal points in off-axis directions relative to the optical axis of said optics;
   first and second photodetectors respectively having a plurality of linear element-boundaries extending in a direction which is coherent with or substantially parallel to a radial line from the center located at a focal point for the 0-order diffraction beam produced from said diffraction element, for receiving said two wave fronts on their detection surfaces located in a plane near the different focal points; and,
   a third photodetector in said plane for receiving the 0-order diffracted beam from said diffraction element.

7. An optical pickup head apparatus according to claim 6 wherein said third photodetector is a two-element photodetector and said optics is disposed such that the direction of a linear element-boundary of said third photodetector is substantially orthogonal to the linear element-boundaries of said first and second photodetectors.

8. An optical pickup head apparatus comprising:
   a light source for emitting a coherent beam or a semi-monochromatic beam;
   an imaging optics for focusing the coherent beam or semi-monochromatic beam into a small spot;
   a diffraction element, disposed in an optical path on which the coherent beam or semi-monochromatic beam passing through said optics is reflected from a given storage medium or diffracted thereby, for producing two wave fronts of the same diffraction order and of two different focal points in off-axis directions relative to the optical axis of said optics; and
   first and second photodetectors respectively having a plurality of linear element-boundaries extending in a direction which is coincident with or substantially parallel to a radial line from the center located at a focal point for the 0-order diffraction beam produced from said diffraction element, for receiving said two wave fronts on their coplanar detection surfaces near the different focal points,
   said diffraction element having two off-axis Fresnel-zone-plate like patterns respectively having focal distances of about $\pm f_z$ for the first-order diffraction beam of a main wavelength of said light source, wherein $$\frac{1}{f_c} - \frac{1}{f_z} = \frac{1}{f_c + \delta}$$

and $$\frac{1}{f_c} + \frac{1}{f_z} = \frac{1}{f_c - \delta}$$

stand where $f_c$ is the focusing radius of the 0-order diffraction beam transmitting through or reflected from said diffraction element toward said photodetectors or the focal point of a focusing lens, and $2\delta$, $\delta$ being a constant, is the distance between said two different focal points and related to $f_c$ by $2\delta < f_c$.

9. An optical pickup head apparatus according to claim 8 wherein the distance $2\delta$ between said two different focal points is defined by $$\frac{f_c}{50} \lesssim 2\delta \lesssim \frac{f_c}{5}.$$

10. An optical pickup head apparatus according to claim 8 wherein two Fresnel-zone-plates having focal distances $\pm f_z$ of substantially the same absolute value and optical axes separated by a predetermined distance are superposed on each other for formation of a phase-type diffraction element.

11. An optical pickup head apparatus comprising:
a light source for emitting a coherent beam or a semi-monochromatic beam;
an imaging optics for focusing the coherent beam or semi-monochromatic beam into a small spot;
a diffraction element, disposed in an optical path on which the coherent beam or semi-monochromatic beam passing through said optics is reflected from a given optical storage medium or diffracted thereby, for producing first and second wave fronts of the same diffraction order and of different focal points in off-axis directions relative to the optical axis of said optics; and
first and second photodetectors respectively having a plurality of linear element-boundaries extending in a direction which is coincident with or substantially parallel to a radial line from the center located at a focal point for the 0-order diffraction beam produced from said diffraction element, for receiving said two wave fronts on their detection surfaces located in a plane near the different focal points,
the direction of the linear element-boundary of each of said first and second photodetectors being substantially coincident or parallel with the direction of the spatial carrier frequency of a diffraction element pattern for production of said first and second wave fronts.

12. An optical pickup head apparatus according to claim 11 wherein said first and second photodetectors have linear element-boundaries which are mutually inclined to make an angle of about 45° therebetween.

13. An optical pickup head apparatus according to claim 11 wherein said first and second photodetectors are photodiodes integrated on the same substrate.

14. An optical pickup head apparatus according to claim 11 wherein said first and second photodetectors are integrated photodiodes and said coherent light source comprised of a semiconductor laser or a solid-state light source equivalent thereto is disposed integrally with the integrated photodiodes near a point at which extensions of linear element-boundaries of said photodiodes are crossed.

15. An optical pickup head apparatus comprising:
a light source for emitting a coherent beam or a semi-monochromatic beam;
an imaging optics for focusing the beam from said light source into a small spot;
a diffraction element, disposed in an optical path on which the coherent beam or semi-monochromatic beam passing through said optics is reflected from a given optical storage medium or diffracted thereby, for producing two wave fronts respectively having indexes of curvature which are of negative and positive curvatures different from the index of curvature of the incident wave front and third and fourth wave fronts having the same index of curvature as that of the incident wave front and different travelling directions, in off-axis directions relative to the optical axis of said optics; and
a plurality of photodetectors, including first and second photodetectors having a plurality of linear element-boundaries extending in radial directions which are coincident with or substantially parallel to radial lines with their center located at a focal point of a 0-order diffraction beam produced from said diffraction element, for receiving said wave fronts on their substantially coplanar detection surfaces near different focal points for said wave fronts.

16. An optical pickup head apparatus according to claim 15 wherein said diffraction element has two parallel grating areas having slit-like apertures, and said set includes at least two three-element photodetectors, the direction of the linear element-boundary of each of said two three-element photodetectors being coincident with the direction of said grating areas.

* * * * *